United States Patent
Noffke

(10) Patent No.: US 9,834,689 B2
(45) Date of Patent: Dec. 5, 2017

(54) AQUEOUS STRIPPING COMPOSITION FOR METAL SURFACES

(71) Applicant: ENTHONE INC., West Haven, CT (US)

(72) Inventor: Frank Noffke, Wuppertal (DE)

(*) Notice: Subject to any disclaimer, the term of this patent is extended or adjusted under 35 U.S.C. 154(b) by 0 days.

(21) Appl. No.: 14/893,854

(22) PCT Filed: May 27, 2014

(86) PCT No.: PCT/US2014/039572
§ 371 (c)(1),
(2) Date: Nov. 24, 2015

(87) PCT Pub. No.: WO2014/190348
PCT Pub. Date: Nov. 27, 2014

(65) Prior Publication Data
US 2016/0108260 A1 Apr. 21, 2016

(30) Foreign Application Priority Data
May 24, 2013 (EP) .................................. 13169155

(51) Int. Cl.
| C11D 7/50 | (2006.01) |
|---|---|
| C09D 9/04 | (2006.01) |
| C09D 9/00 | (2006.01) |
| C23C 22/05 | (2006.01) |
| C23C 22/60 | (2006.01) |

(52) U.S. Cl.
CPC .................. C09D 9/04 (2013.01); C09D 9/00 (2013.01); C23C 22/05 (2013.01); C23C 22/60 (2013.01)

(58) Field of Classification Search
CPC .. C11D 3/044; C11D 3/43; C11D 7/06; C11D 7/5022; C11D 1/02; C11D 1/66
See application file for complete search history.

(56) References Cited

U.S. PATENT DOCUMENTS

| 2,962,395 | A | * | 11/1960 | Brown ..................... C09D 9/00 134/38 |
|---|---|---|---|---|
| 3,284,365 | A | | 11/1966 | Bourean et al. |
| 4,537,705 | A | | 8/1985 | Mahoney et al. |
| 5,520,841 | A | * | 5/1996 | Block ....................... C11D 3/06 510/254 |
| 5,525,207 | A | * | 6/1996 | Becking ................... C25D 3/02 205/238 |
| 5,814,588 | A | * | 9/1998 | Cala ......................... C11D 1/58 510/175 |
| 6,277,799 | B1 | * | 8/2001 | Sachdev ................. C11D 1/008 134/2 |
| 2006/0079437 | A1 | | 4/2006 | Kondo et al. |
| 2006/0089281 | A1 | * | 4/2006 | Gibson ................... C09D 9/005 510/201 |
| 2008/0234164 | A1 | * | 9/2008 | Tyborski .............. C11D 3/0073 510/254 |
| 2010/0173820 | A1 | * | 7/2010 | Smith ..................... C11D 3/046 510/488 |
| 2010/0317559 | A1 | * | 12/2010 | Ryther ................... C11D 3/044 510/218 |
| 2010/0317560 | A1 | * | 12/2010 | Ryther ................... C11D 3/044 510/218 |
| 2011/0312871 | A1 | * | 12/2011 | Miralles ................. C11D 3/044 510/480 |
| 2012/0142577 | A1 | | 6/2012 | Sun et al. |
| 2012/0295829 | A1 | * | 11/2012 | Peitersen ............. C11D 3/0073 510/218 |
| 2015/0038391 | A1 | * | 2/2015 | De Wit ............... C11D 11/0023 510/238 |
| 2015/0203791 | A1 | * | 7/2015 | Peitersen ............. C11D 3/0073 510/197 |
| 2015/0225676 | A1 | * | 8/2015 | De Wit .................... C11D 3/43 510/401 |

FOREIGN PATENT DOCUMENTS

| CN | 101137727 | 12/2010 |
|---|---|---|
| WO | 03/029393 | 4/2003 |
| WO | 2006/113144 | 10/2006 |

OTHER PUBLICATIONS

International Search Report, PCT/US2014/039572, dated Sep. 30, 2014, 3 pages.
Written Opinion, PCT/US2014/039572, dated Sep. 30, 2014, 4 pages.
Dow, Caustic Soda, The Dow Chemical Company, 3 pages, <https://web.archive.org/web/20130104223531/http:/www.dow.com/causticsoda/offer/physical.htm>.

* cited by examiner

Primary Examiner — Gregory E Webb
(74) Attorney, Agent, or Firm — Carmody Torrance Sandak & Hennessey LLP

(57) ABSTRACT

The invention relates to an aqueous stripping composition for the removal of polymeric surface sealants on metal surfaces, said stripping composition comprising an alkalizing agent, a polymer splitting agent, a swelling agent, and a cloud point booster, wherein said polymer splitting agent is at least one gluconate wherein said swelling agent is at least one compound selected from the group consisting of glycol ethers and aliphatic alcohols having 3 to 9 carbon atoms. The inventive aqueous stripping composition is capable to remove polymeric sealants like e.g. polyurethane sealants, polyethylene sealants, polyethylene waxes, polyacrylic sealants, polysilicate sealants, and the like.

14 Claims, No Drawings

AQUEOUS STRIPPING COMPOSITION FOR METAL SURFACES

REFERENCE TO RELATED APPLICATIONS

This application is a U.S. national stage application of International Patent Application No. PCT/US2014/039572, filed May 27, 2014, and claims priority to European Application No. 13169155.2, filed May 24, 2013, the entire disclosures of which are incorporated herein by reference.

The present invention relates to an aqueous stripping composition for the removal of polymeric surface sealants on metal surfaces. Furthermore, the present invention relates to a method for the removal of polymeric surface sealants from metal surfaces.

It is well-known in the art of surface technology to post-treat metal layers deposited on a substrate surface, either by galvanic deposition, autocatalytic deposition or other methods like PVD or CVD, to adjust the surface characteristics or features. One of the main features which is intended to be adjusted by a post-treatment is the corrosion resistance of a surface layer.

The protection against corrosion of metal surfaces, like e.g. steel surfaces, tin surfaces or zinc or zinc alloy surfaces is of great commercial interest in various industries, like e.g. construction, marina, automotive, and aircraft industries. There are many established techniques which provide a satisfactory corrosion protection performance, like e.g. protective coating by paint coatings, waxes or polymeric sealants. Based on the intended final use of the substrate an adequate method to improve the corrosion resistance can be chosen.

For example, a widely known technique to improve the corrosion resistance of metal surfaces is the protection of the surface by an anti-corrosion paint.

Another method to increase the corrosion resistance of a surface layer is the coating of a metal surface with a corrosion inhibiting polymer layer. WO 2010/056386 discloses a method in which the metal surface is brought into contact with a corrosion resistance increasing solution comprising polyvinyl phosphonic acid and/or polyacrylic acids and/or copolymers of such acids.

Also US 2007/0014924 A1 discloses a method for coating metal surfaces with corrosion-inhibiting polymer layers. Here, the surface to be protected is brought into contact with a primer composition comprising an organo-phosphorous compound prior to contacting the surface with a sealant composition comprising a monomeric resin, a polymeric resin, or a combination thereof.

Other sealants used in various industries are e.g. polyurethane sealants, polyethylene sealants like e.g. PE-waxes, polyacrylic sealants or also anorganic sealants like e.g. polysilicate sealants.

In the field of zinc deposition on surfaces, often the corrosion resistance of the zinc layer is increased by passivating the surface. By passivation the metal surface becomes less affected by environmental factors such as air or water. A well-known passivation of zinc coatings is the chromate conversion coating, which is also used to passivate surfaces of aluminum, cadmium, copper, silver, magnesium, and tin alloys. Often, such conversion coating is additionally protected against corrosion by a sealant. While sealing of the surfaces improves the corrosion resistance and also has a certain effect on the friction coefficient of the substrate or may give a special appearance, there is a general problem to remove such sealants from the substrate surfaces, if needed. A situation where remove of such sealants is needed may be the rework of the surfaces in case of plating failures or plating deficits to avoid dumping of the whole substrate.

Additionally, in plating processes the substrate to be metallized or on which a sealant should be applied will be attached to pucks or cracks of the plating equipment. Such pucks or cracks naturally will come into contact with the sealants which over the time may form thick crusts and cakes on the plating equipment. If the sealants cannot be removed thoroughly the sealant or at least cracks and parts of the sealant will contaminate the whole plating process which in turn results in plating failures and deficits.

Different approaches are known from the art to remove the sealant residues from the substrates for rework and from the plating equipment. One way to remove the sealant from substrate or equipment surfaces is the mechanical removal by blast cleaning which is laborious and may also destroy the substrate or the plating equipment. Another approach to remove sealant residues is the use of organic solvents. However, such solvents in general comprise volatile organic compounds which may be environmentally problematic.

Among other aspects it is therefore an object of the invention to provide a composition for the removal of polymeric sealants on substrate surfaces, especially on metal substrate surfaces. Furthermore, it is an aspect of the invention to provide a method for the removal of polymeric surface sealants from said surfaces.

Surprisingly, it was found that the object of the invention with respect to the composition is solved by an aqueous stripping composition according independent claim 1.

By independent claim 1, an aqueous stripping composition for the removal of polymeric surface sealants on metal surfaces is provided, said stripping composition comprising an alkalizing agent, a polymer splitting agent, a swelling agent, and a cloud point booster, wherein said polymer splitting agent is at least one glutamate and wherein said swelling agent is at least one compound selected from the group consisting of glycol ethers and aliphatic alcohols having 3 to 9 carbon atoms.

The aqueous stripping composition provided by the invention is capable to remove polymeric sealants from metal surfaces like e.g. zinc or zinc alloy surfaces, steel surfaces, passivated or chromated zinc or zinc alloy surfaces and chromium plated material (deposited from e.g. $Cr^{3+}$ or $Cr^{6+}$ electrolytes) on steel, plated steel or on plated plastic. Furthermore, the stripping composition is capable to remove sealant residues from plating equipment like e.g. hooks or racks. It was furthermore found that the inventive aqueous stripping composition is capable to be used as a soak cleaner or electrolytic cleaner for metal substrates. An outstanding cleaning effect can also be achieved to clean and remove the paste from industrial brushed, grinded or polished metal surfaces.

By the use of the inventive aqueous stripping composition the overall surface treatment process can be enhanced due to avoid cleaning procedures and the fresh makeup of plating bases. Furthermore, rework of insufficiently plated substrates is easily possible. Even other process solutions used in plating processes like e.g. zinc plating and passivation last longer, for example the passivation solution, the cleaning solution as well as the sealant solution. By this plating failures can be reduced which are based on the carryover of sealant residues from one plating tank to another.

According to an embodiment of the invention the cloud point booster comprised in the aqueous stripping composition is at least one alkyl benzene sulfonate. Preferably, the cloud point booster is at least one alkyl benzene sulfonate according to formula I.

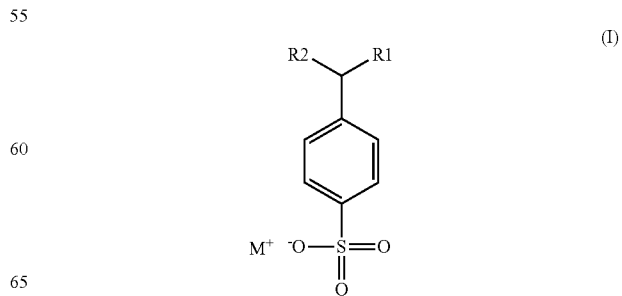

wherein R₁ and R₂ are independently from each other H or a branched or unbranched $C_1$ to $C_{13}$ alkyl group, and M is at least one metal selected from the group consisting of Li, Na, K, or a naphthyl sulfopropyl diether according to formula II.

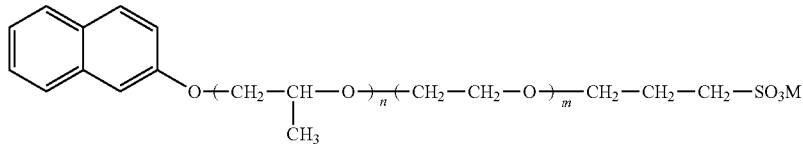

(II)

wherein m=1-11, and n=1-17 and N is at least one metal selected from the group consisting of Li, Na, K.

By the term cloud point booster a compound is meant which influences the cloud point of a composition. The cloud point of a liquid composition is the temperature at which the solved solids are no longer completely soluble, precipitating as a second phase giving the fluid a cloudy appearance.

According to another embodiment of the invention, the alkalizing agent comprised in the aqueous stripping composition may be selected from the group of alkali hydroxides and alkaline earth hydroxides like e.g. lithium hydroxide, sodium hydroxide, rubidium hydroxide, magnesium hydroxide, calcium hydroxide or barium hydroxide.

According to another embodiment of the invention the stripping composition has a pH-value of ≥13. Accordingly, the alkalizing agent can be comprised in the aqueous stripping composition in a concentration to provide an adequate pH-value. In terms of the invention, the pH-value is measured as the real pH-value and not influenced by any measurement failure like e.g. the alkali failure occurring by measuring the pH-value of high alkali solutions using a glass electrode. Accordingly, the pH-value should be defined as the OH⁻ activity (OH⁻-concentration in the solution) ≥0.1 mol/l.

According to another embodiment of the invention, the alkalizing agent can be comprised in the composition in a concentration of between ≥30 g/l to ≤300 g/l, preferably in a range of between ≥50 g/l and ≤250 g/l.

According to another embodiment of the invention, the polymer splitting agent is at least one gluconate of the group consisting of sodium gluconate, lithium gluconate, potassium gluconate or a mixture of these. According to preferred embodiments of the invention the polymer splitting agent is comprised in a concentration range of between ≥1 g/l and ≤100 g/l, preferably in a range of between ≥10 g/l and ≤80 g/l. The polymer splitting agent acts as a splitter to the polymer chains cracking the polymer chains into smaller fragments.

According to an embodiment of the invention the swelling agent comprised in the aqueous stripping composition is a glycol ether of the group consisting of diethylene glycol monoethyl ether, diethyleneglycol monobutylether, ethylene glycol monomethyl ether, ethylene glycol monoethyl ether, ethylene glycol monopropyl ether, ethylene glycol monoisopropyl ether, ethylene glycol monobutylether, ethylene glycol monophenyl ether, ethylene glycol monobenzyl ether, and diethylene glycol monomethyl ether, or a mixture of these.

According to an embodiment of the invention the swelling agent comprised in the aqueous stripping composition is an aliphatic alcohol having 3 to 9 carbon atoms, like e.g. isopropanol, dimethyl hepanol, or nonyl alcohol.

According to another embodiment of the invention the swelling agent comprised in the aqueous stripping composition is a mixture of at least one of the glycol ethers mentioned above and an aliphatic alcohol having 3 to 9 carbon atoms.

The swelling agent causes a swelling of the polymeric sealant surface which enables a better cracking of the polymer chains by the polymer splitting agent.

In a preferred embodiment of the invention the swelling agent is comprised in a concentration range of between ≥1 g/l and ≤200 g/l, preferably in a range of between ≥5 g/l and ≤150 g/l. To reduce the pollution by volatile organic compounds the concentration of the swelling agent in the inventive aqueous stripping composition may be preferably in a concentration ≤100 g/l, more preferred in a concentration ≤80 g/l like e.g. ≤50 g/l.

According to another embodiment of the invention, the aqueous stripping composition may additionally comprise a surfactant. In a more preferred embodiment the surfactant which may optionally be comprised in the composition is a non-ionic surfactant, preferably a polyglycoside and most preferred a polyglycoside according to formula III.

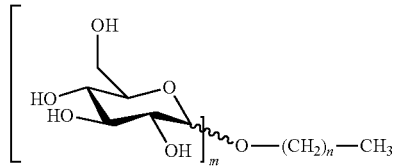

(III)

wherein m=1-5, and n=5-15.

The surfactant may be comprised in the inventive stripping composition in a concentration of ≤100 g/l, preferably in a range of between ≥0.5 g/l to ≤90 g/l.

The surfactant optionally comprised in the stripping composition also influences the surface tension of the composition. In a preferred embodiment the composition has a surface tension at 20° C. of ≤35 mN/m, preferably in a range of between ≥25 mN/m to ≤35 mN/m. Here, it is preferred that the surface tension is measured by a bubble pressure tensiometer.

According to another embodiment of the invention, the inventive stripping composition may be provided to a user in form of a two-parted pre-mixture, wherein one part of the mixture comprises at least the swelling agent and the cloud point booster, while the other part of the mixture comprises at least the polymer splitting agent. By shipping and delivering of the inventive composition in form of two separate compositions to be mixed at the customer side the stability of the composition can be increased. At the customer side the two components are mixed with water, preferably the de-ionized water. So, the components can be shipped as a concentrate to reduce the shipping costs.

The invention relates further to a method for the removal of polymeric surface sealants from metal surfaces as claimed by independent claim 12. Accordingly, a method for the removal of polymeric surface sealants from metal surfaces is provided, said method comprising the steps of contacting the surface from which the polymeric surface sealant should be removed with an aqueous stripping composition according to the invention.

In a preferred embodiment of the inventive method the surface from which the polymeric surface sealant should be removed is brought into contact with said aqueous stripping composition at a temperature in a range of between ≥10° C. and ≤100° C., preferably in a range of between ≥50° C. and ≤80° C.

According to the inventive method, the surface from which the polymeric surface sealant should be removed may be brought into contact with the aqueous stripping composition for a time of ≤60 min, preferably for a time of between ≤45 min and ≥15 s.

The inventive method as well as the inventive stripping composition may be used to remove polymeric surface sealants of the group consisting of polyurethane sealants, polyethylene sealants, polyethylene waxes, polyacrylic sealants, polysilicate sealants, and the like.

To bring the inventive aqueous stripping composition into contact with the surface from which the polymeric surface sealant should be removed the substrate to be cleaned may be dipped into the inventive stripping composition or the composition may be sprayed onto the surface to be cleaned by appropriate means, like e.g. spraying nozzles. After contacting the surface from which the polymeric surface sealant should be removed the surface may be rinsed by de-ionized water.

When the surface from which the polymeric surface sealant should be removed is brought into contact with the inventive stripping composition by dipping the substrate into the composition the use of a skimmer or an adequate surface flooding/overflow is preferred to remove sealant residues floating on the aqueous stripping composition from the process tank.

Furthermore, to remove sediments from the process tanks used to hold the stripping composition filters can be used while pumps are used to agitate the stripping composition in the tank.

It is furthermore preferred that the stripping composition is agitated when the substrate to be cleaned is brought into contact with said stripping composition. To do so, also the substrate to be cleaned may be moved while being dipped into the stripping composition.

The invention is additionally explained by the following examples while the inventive idea is not limited to these embodiments in any way.

EXAMPLE 1

An aqueous stripping composition is provided by adding to 1000 ml tab water 50 g KOH as a alkalizing agent, 1 g potassium gluconate as a polymer splitting agent, 5 g ethylene glycol monoethyl ether as a swelling agent, 20 g of a cloud point booster according to general formula II (RALUFON NAPE 14-90, available from Raschig GmbH, Germany), and 8 g of a surfactant according to general formula III.

A mild steel panel S235JR+AR plated with 10 m zinc from an alkaline zinc bath, passivated with PERMA PASS 3082 (a passivation commercial available from Enthone Inc., USA), sealed with ENSEAL 135 (a polyurethane based sealant commercial available from Enthone Inc., USA) and crosslinked in an oven was emerged in a solution according to example 1 at a temperature of 30° C. for 45 minutes. After removing the steel panel from the solution and rinsing in tab water, it was dipped in a copper sulfate solution. After removing the panel from the copper sulfate solution rinsing and drying it, a complete black conversion layer demonstrates the success of removing the sealant.

The invention claimed is:

1. An aqueous stripping composition for the removal of polymeric surface sealants on metal surfaces, said stripping composition comprising:
   a) 30 to 300 g/L of an alkalizing agent,
   b) 1-100 g/L of a polymer splitting agent, wherein the polymer splitting agent is at least one gluconate,
   c) 5 to 150 g/L of a swelling agent, wherein the swelling agent is at least one compound selected from the group consisting of glycol ethers and mono-alcohols having 3 to 9 carbon atoms,
   d) a cloud point booster, wherein the cloud point booster is at least one alkylbenzenesulfonate according to formula I

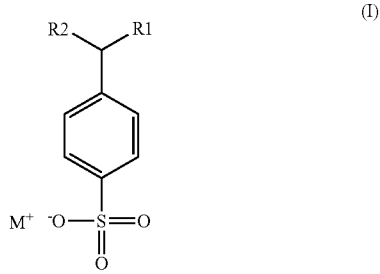

wherein $R_1$ and $R_2$ are independently from each other H or a branched or unbranched $C_1$ to $C_{13}$ alkyl group, and M is at least one metal selected from the group consisting Li, Na, K, or a naphthyl sulfopropyl diether according to formula II

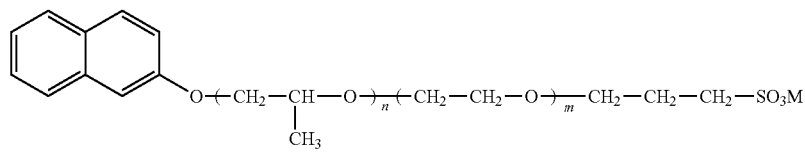

wherein m=1 to 11, and n=1 to 17 and M is at least one metal selected from the group consisting Li, Na, K, and
   e) 0.5 to 95 g/L of a surfactant.

2. The stripping composition according to claim 1 wherein the cloud point booster is the alkylbenzenesulfonate according to formula I.

3. The stripping composition according to claim 1, said composition having a pH-value of ≥13.

4. The stripping composition according to claim 1 wherein the surfactant is a non-ionic surfactant.

5. The stripping composition according to claim 1, wherein said surfactant is a polyglucoside according to formula III

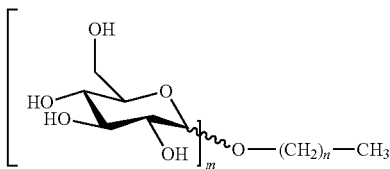

wherein m=1 to 5, and n=5 to 15.

6. The stripping composition according to claim 1, wherein said surfactant is comprised in a concentration of ≤100 g/l.

7. The stripping composition according to claim 1, wherein the composition has a surface tension at 20° C. of ≤35 mN/m.

8. An aqueous stripping composition for the removal of polymeric surface sealants on metal surfaces, said stripping composition comprising an alkalizing agent, a polymer splitting agent, a swelling agent, and a cloud point booster, wherein said polymer splitting agent is at least one gluconate and wherein said swelling agent is at least one compound selected from the group consisting of glycol ethers and mono-alcohols having 3 to 9 carbon atoms, wherein the cloud point booster is a naphthyl sulfopropyl diether according to formula II

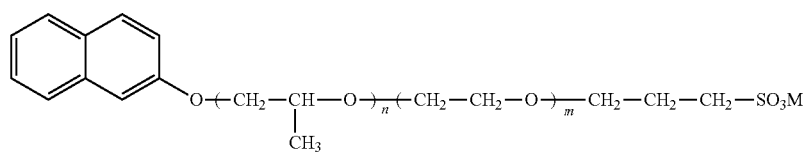

wherein m=1 to 11, and n=1 to 17 and M is at least one metal selected from the group consisting Li, Na, K.

9. The stripping composition according to claim 8, said composition having a pH-value of ≥13.

10. The stripping composition according to claim 8, wherein said polymer splitting agent is comprised in a concentration range of between ≥1 g/l and ≤100 g/l.

11. The stripping composition according to claim 8, wherein said swelling agent is comprised in a concentration range of between ≥1 g/l and ≤200 g/l.

12. The stripping composition according to claim 8, wherein said cloud point booster is comprised in a concentration range of between ≥1 g/l and ≤100 g/l.

13. The stripping composition according to claim 8, wherein the composition further contains a surfactant.

14. The stripping composition according to claim 13, wherein the surfactant is a polyglucoside according to formula III

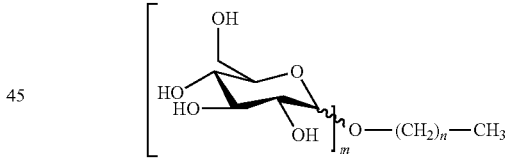

wherein m=1 to 5, and n=5 to 15.

* * * * *